US012435733B2

(12) United States Patent
Tietz et al.

(10) Patent No.: US 12,435,733 B2
(45) Date of Patent: Oct. 7, 2025

(54) HEAT EXCHANGER WITH CURVED CORE AREA AND INTENDED FOR USE WITH AN AGRICULTURAL PUMPER TRUCK

(71) Applicant: Air Power Systems Co., LLC, Tulsa, OK (US)

(72) Inventors: Ryan S. Tietz, Mounds, OK (US); Vinay Kumar Dandamudi, Tulsa, OK (US)

(73) Assignee: Air Power Systems Co., LLC, Tulsa, OK (US)

( * ) Notice: Subject to any disclaimer, the term of this patent is extended or adjusted under 35 U.S.C. 154(b) by 0 days.

(21) Appl. No.: 18/629,566

(22) Filed: Apr. 8, 2024

(65) Prior Publication Data

US 2024/0255003 A1 Aug. 1, 2024

Related U.S. Application Data

(63) Continuation-in-part of application No. 17/937,943, filed on Oct. 4, 2022, now Pat. No. 12,025,379.

(Continued)

(51) Int. Cl.

| | |
|---|---|
| ***F28D 1/047*** | (2006.01) |
| ***F04D 17/08*** | (2006.01) |
| ***F04D 29/42*** | (2006.01) |

(52) U.S. Cl.

CPC ......... *F04D 29/4226* (2013.01); *F04D 17/08* (2013.01); *F28D 1/047* (2013.01); *F05D 2260/22141* (2013.01)

(58) Field of Classification Search

CPC ..................... F28D 1/047; F28D 1/024; F28D 2001/0273; F28D 2021/004

See application file for complete search history.

(56) References Cited

U.S. PATENT DOCUMENTS 4,876,778 A * 10/1989 Hagihara ............ F28D 1/05383 29/428
5,564,495 A * 10/1996 Yoshihashi ............... F28F 1/32 165/145

(Continued)

FOREIGN PATENT DOCUMENTS

| | | |
|---|---|---|
| EP | 1329682 A2 | 7/2003 |
| WO | 2016067408 A1 | 5/2016 |

OTHER PUBLICATIONS

International Search Report and Written Opinion for Application No. PCT/US2025/023669, dated Jul. 23, 2025.

*Primary Examiner* — Jon T. Schermerhorn, Jr.
(74) *Attorney, Agent, or Firm* — Kevin E. West; Advent, LLP

(57) ABSTRACT

Embodiments of a hydraulic reservoir cooler include a backward curve centrifugal fan located rearward of a vented front cover of the cooler, the centrifugal fan having a center point "c" and a radius "r"; and a core area including fins and a manifold in fluid communication with a hydraulic fluid tank, the core area including a straight vertical portion extending in height less than an uppermost upper end of the centrifugal fan; a straight horizontal portion located above the uppermost upper end of the centrifugal fan; and an intermediate portion connecting the straight vertical and horizontal portions. In some embodiments, the intermediate portion comprises a curve having a center point "C" and a radius "R"; where C is located above c and R is greater than r. The cooler may be adapted for use with an agricultural pumper truck.

6 Claims, 12 Drawing Sheets

Related U.S. Application Data

(60) Provisional application No. 63/251,975, filed on Oct. 4, 2021.

(56) References Cited

U.S. PATENT DOCUMENTS

| | | | | |
|---|---|---|---|---|
| 6,050,773 | A | 4/2000 | Bushnell | |
| 7,013,961 | B2 * | 3/2006 | Song | F28F 9/002<br>29/890.03 |
| 10,088,176 | B2 | 10/2018 | Ikeda et al. | |
| 10,634,434 | B2 | 4/2020 | Laurila et al. | |
| 11,280,348 | B2 | 3/2022 | Dong et al. | |
| 2017/0059253 | A1 | 3/2017 | Laurila et al. | |
| 2018/0023587 | A1 | 1/2018 | Otsuka | |
| 2020/0355197 | A1 | 11/2020 | Dong et al. | |
| 2022/0146213 | A1 | 5/2022 | Saviers et al. | |

* cited by examiner

HEAT EXCHANGER WITH CURVED CORE AREA AND INTENDED FOR USE WITH AN AGRICULTURAL PUMPER TRUCK

CROSS-REFERENCE TO CO-PENDING APPLICATIONS

This application is a continuation-in-part of U.S. Ser. No. 17/937,943 filed Oct. 4, 2022 which, in turn, claimed priority to U.S. Provisional 63/251,975 filed Oct. 4, 2021.

BACKGROUND

This disclosure is directed toward systems and apparatuses designed to cool and condition hydraulic oil on mobile equipment and transportation applications with hydraulic drive. The mobile equipment may be a pumper truck including a hydraulic motor connected to a processing pump for pumping liquids into or out of the truck's tank. The pumper truck may be configured for agricultural use and the liquids being pumped may include an agricultural product like corn syrup. A prior art cooler and its installation is shown in FIGS. 1 and 2.

Agricultural pumper trucks may include a hydraulic motor connected to a processing pump that pump liquids such as corn syrup. A hydraulic reservoir cooler may be connected to the hydraulic motor, cooling and conditioning hydraulic fluid returned to the tank of the cooler. The cooled and conditioned hydraulic fluid is then pumped to the hydraulic motor of the processing pump. FIGS. 1 and 2 illustrate a prior art cooler and its installation.

The hydraulic reservoir cooler is mounted on the side of truck and space is limited for its mounting. Heat rejection requirements are increasing for these types of applications but the amount of space available on the truck for the cooler remains unchanged.

SUMMARY

Embodiments of a hydraulic reservoir cooler of this disclosure include a backward curve centrifugal fan located rearward of a vented front cover of the cooler, the centrifugal fan having a center point "c" and a radius "r" and arranged to provide substantially horizontal air flow through the vented front cover; and a core area including fins and a manifold in fluid communication with a hydraulic fluid tank, the core area being located between the vented front cover and the backward curve centrifugal fan; the core area further including: a straight vertical portion extending in height less than an uppermost upper end of the backward curve centrifugal fan; a straight horizontal portion located above the uppermost upper end of the backward curve centrifugal fan; and a curved portion connecting the straight vertical and horizontal portions, the curved portion having a center point "C" and a radius "R"; where C is located above c and R is greater than r. In other embodiments, the core are may be L-shaped for manufacturability, the vertical and horizontal straight portions forming a right angle. The cooler may be adapted for use with an agricultural pumper truck.

ELEMENTS AND NUMBERING USED IN THE DRAWINGS

Figure 1:
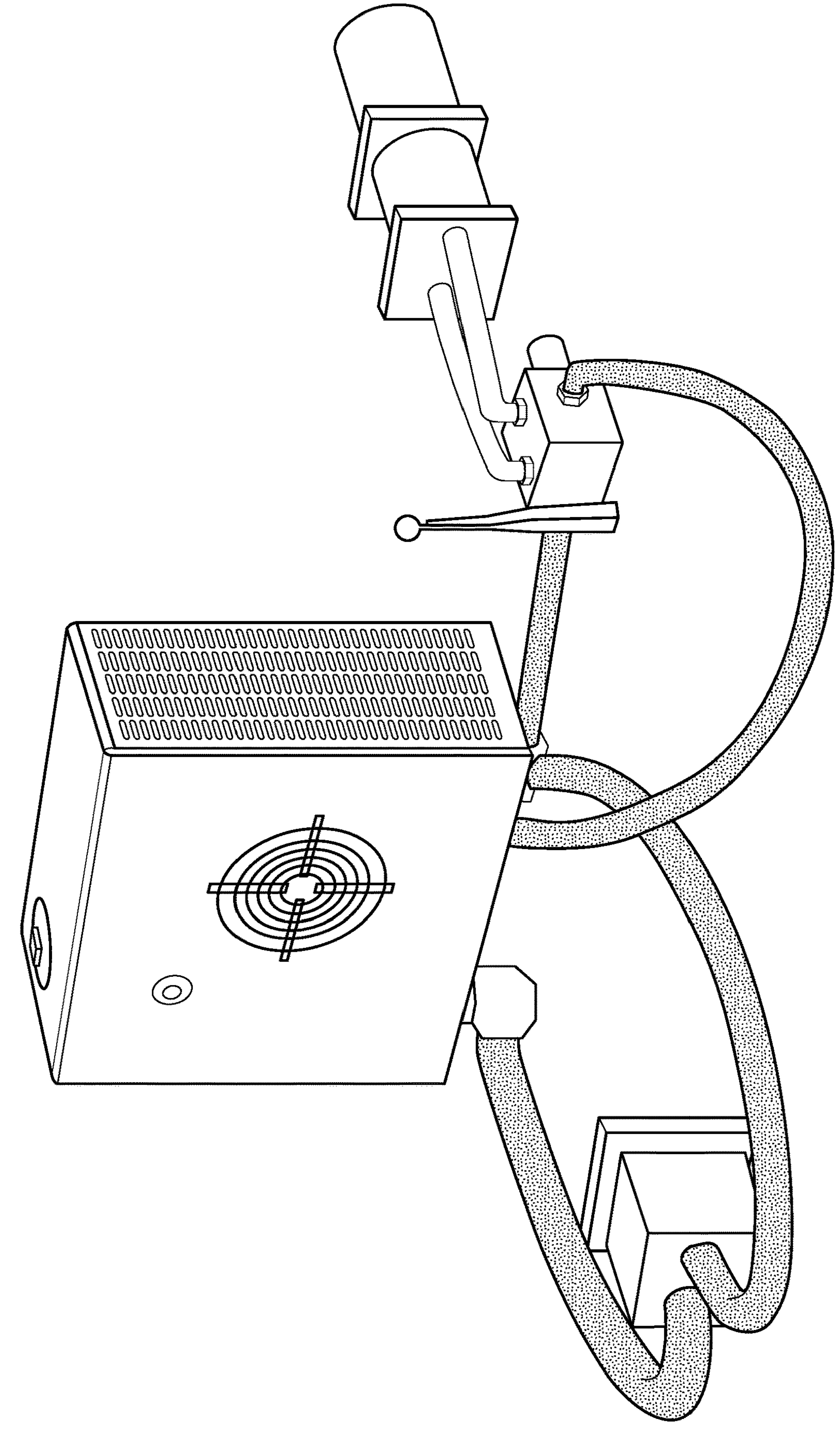
Fig. 1 (PRIOR ART)
FIG. 1 illustrates a typical installation example of a prior art hydraulic reservoir cooler. Embodiments of a hydraulic reservoir cooler of this disclosure may be configured for the same or similar installation.
Figure 2:
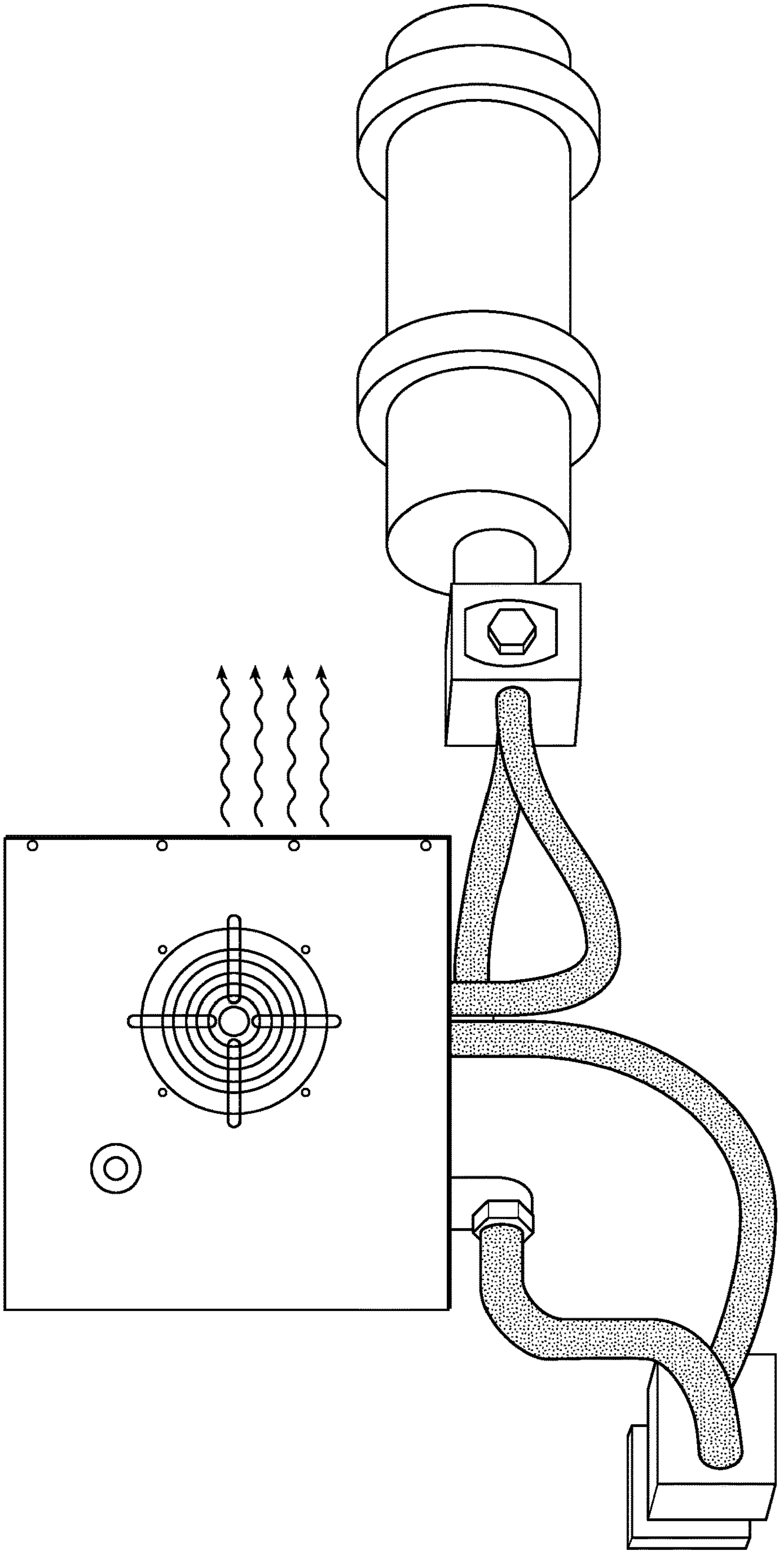
Fig. 2 (PRIOR ART)
FIG. 2 illustrates another typical installation example of a prior art hydraulic reservoir cooler, in this case, an installation without a directional control valve. Embodiments of a hydraulic reservoir cooler of this disclosure may be configured for the same or similar alternate installation.
Figure 3:
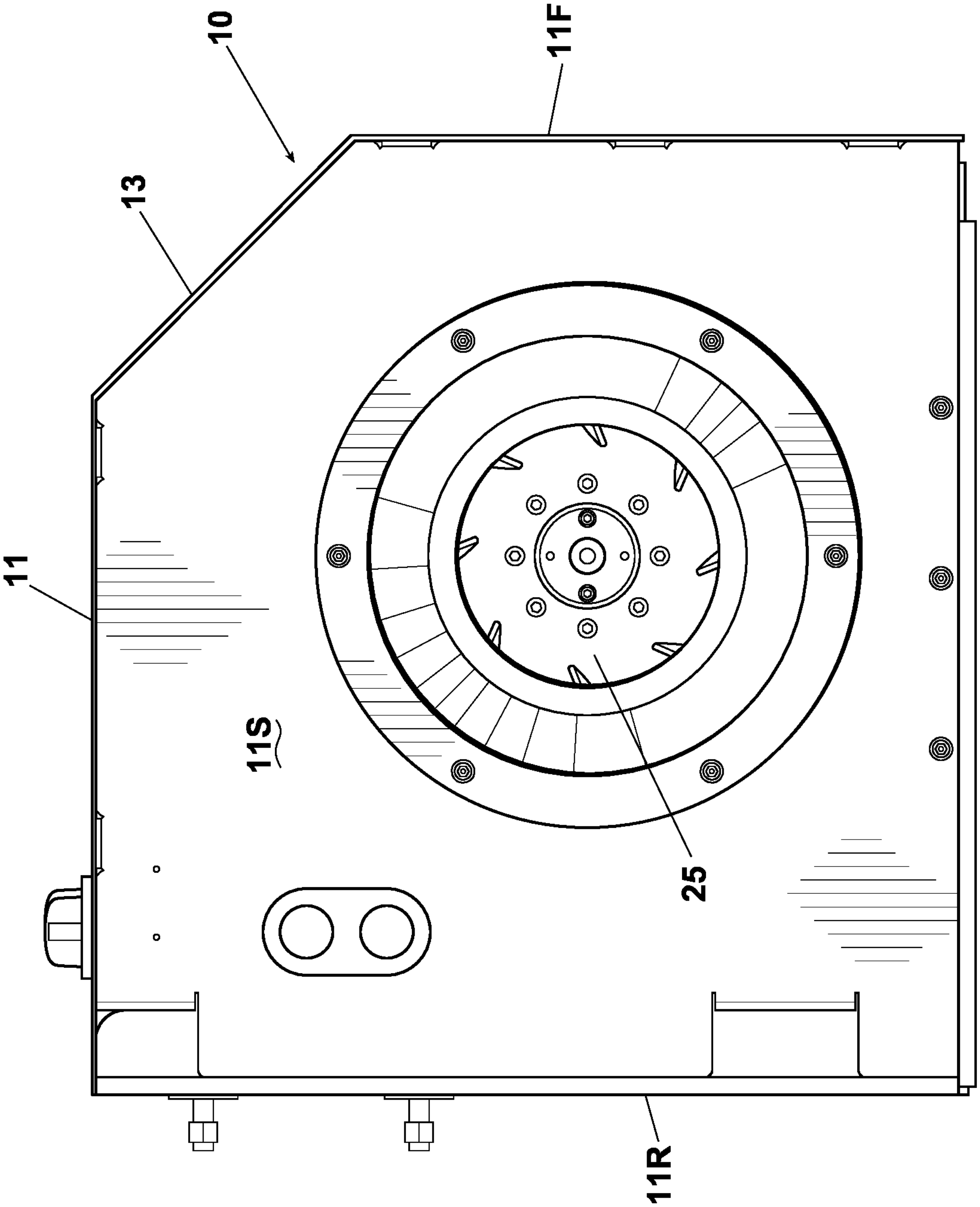
FIG. 3 is a side elevation view of an embodiment of a hydraulic reservoir cooler of this disclosure. The cooler includes a heat exchanger having a curved core area between the headers located at the top and bottom (see FIGS. 7 and 8).
Figure 4:
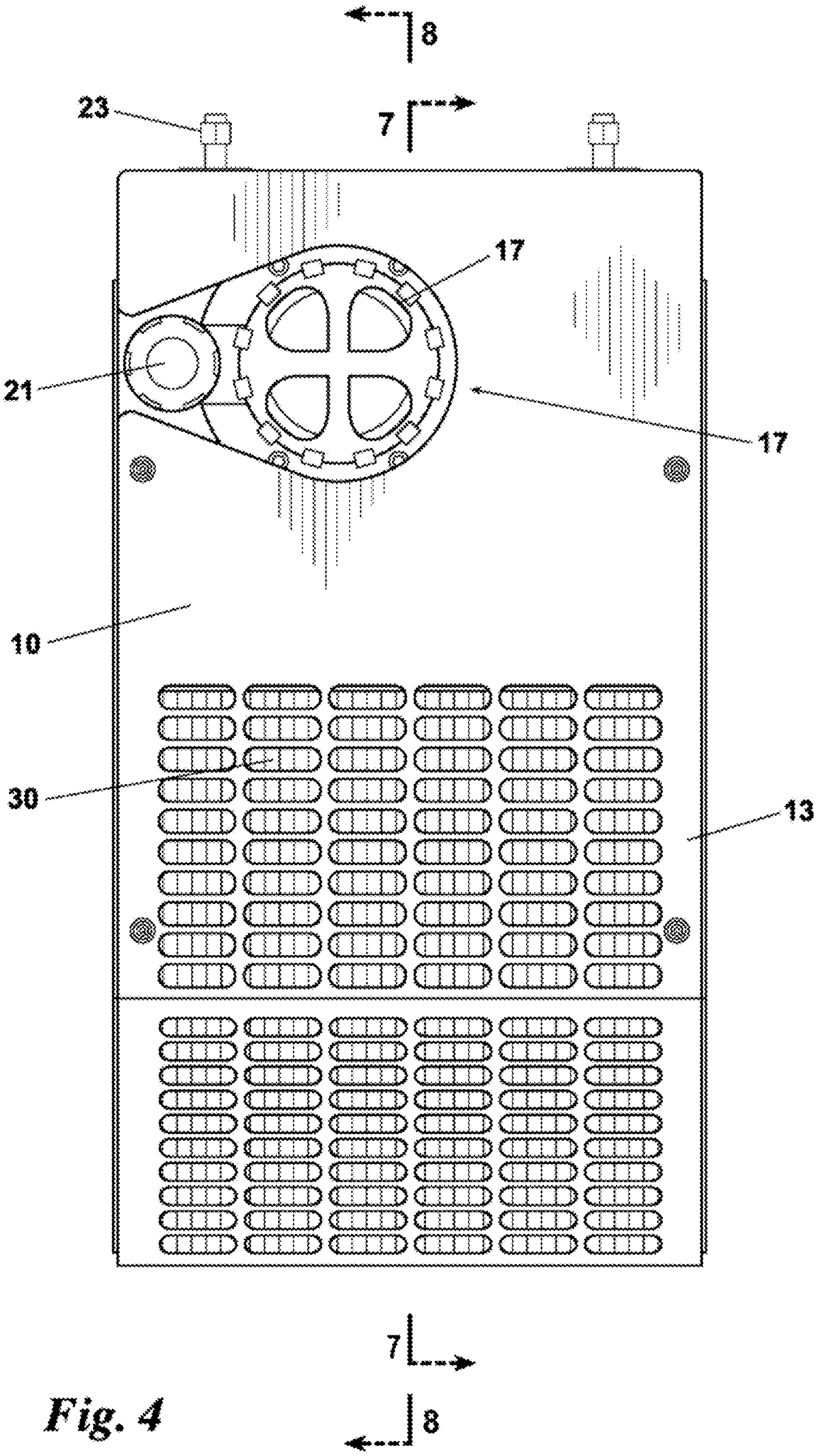
FIG. 4 is top plan view of the cooler of FIG. 3.
Figure 5:
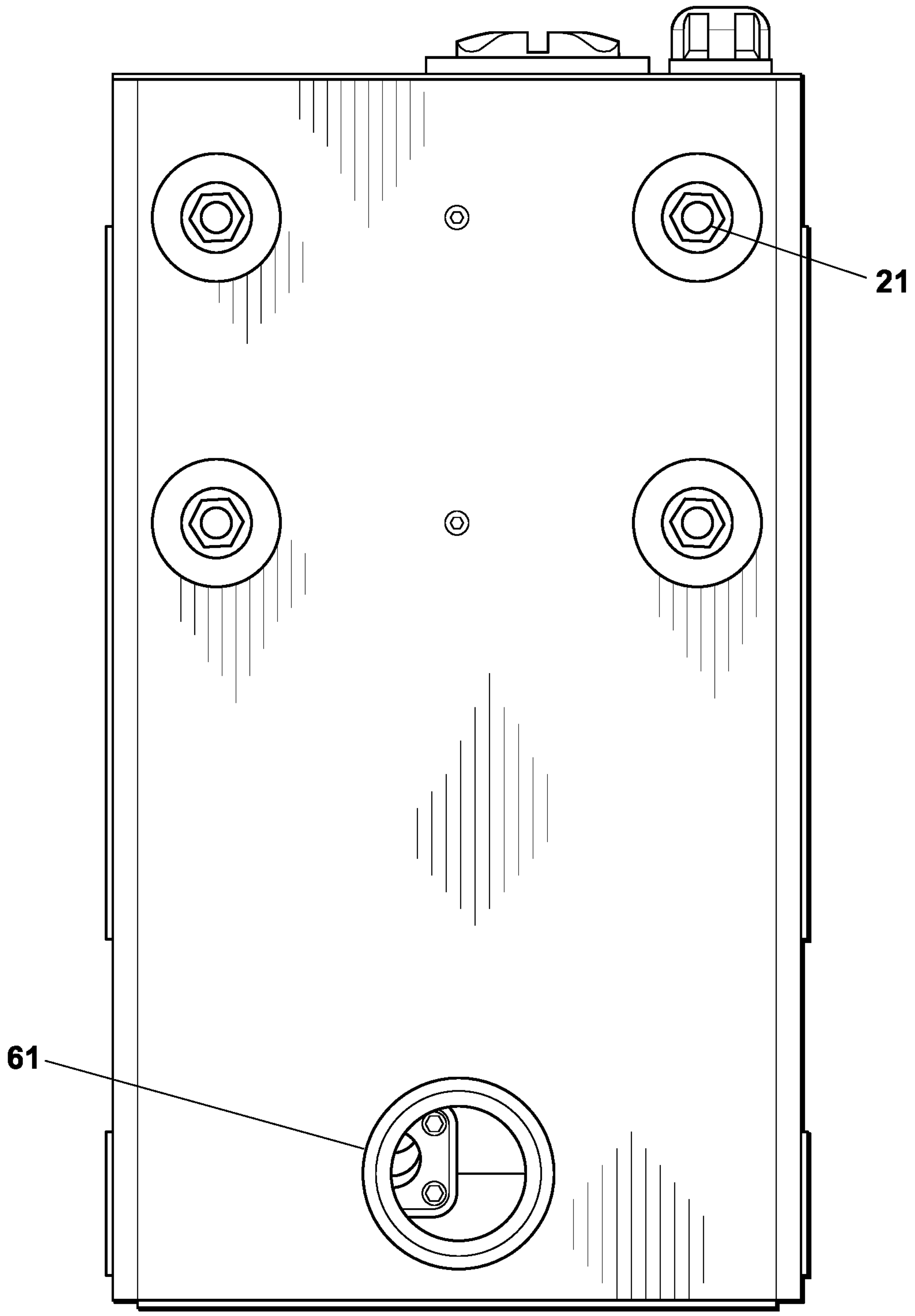
FIG. 5 is a rear elevation view of the cooler of FIG. 3.
Figure 6:
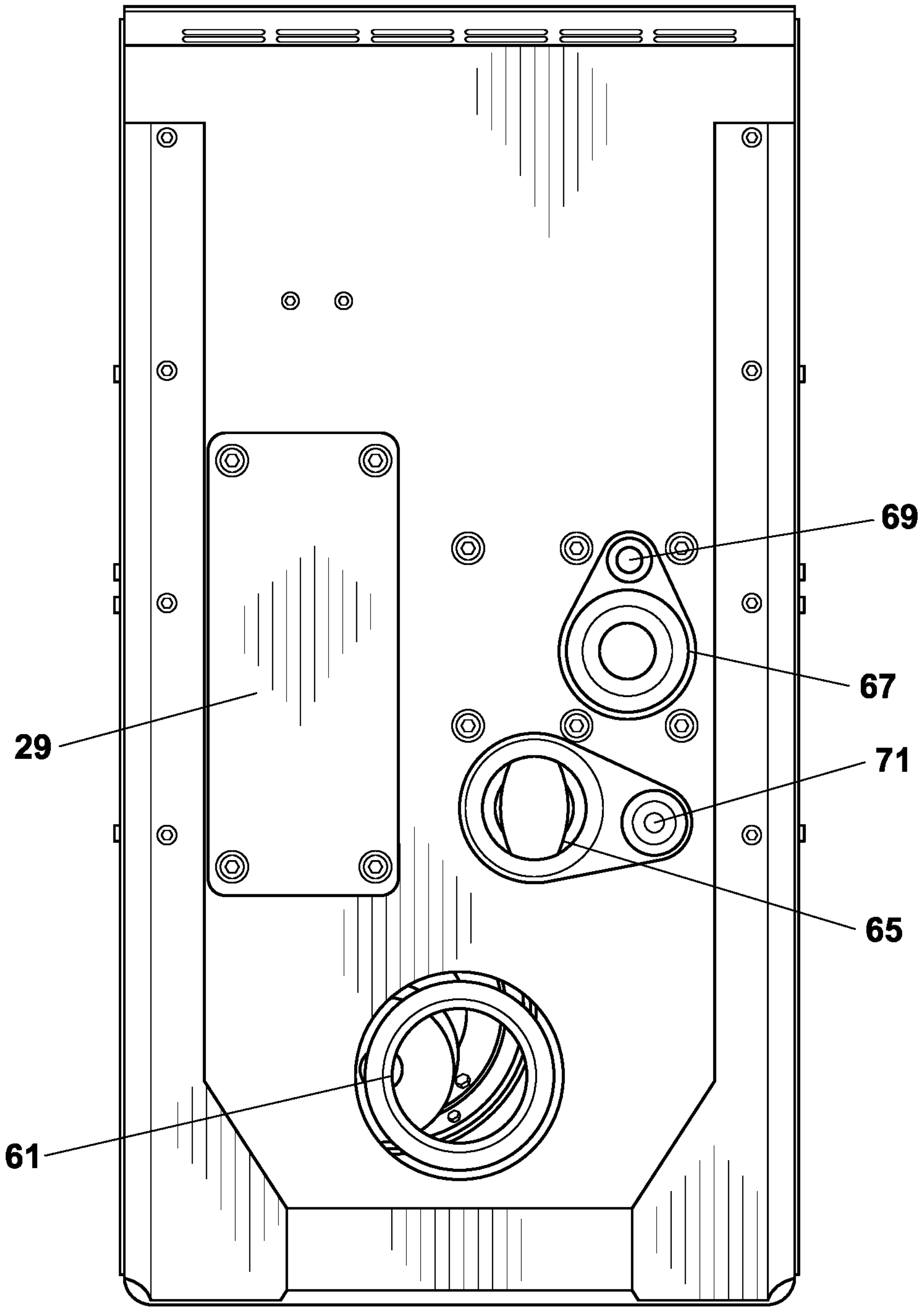
FIG. 6 is a bottom plan view of the cooler of FIG. 3.
Figure 7:
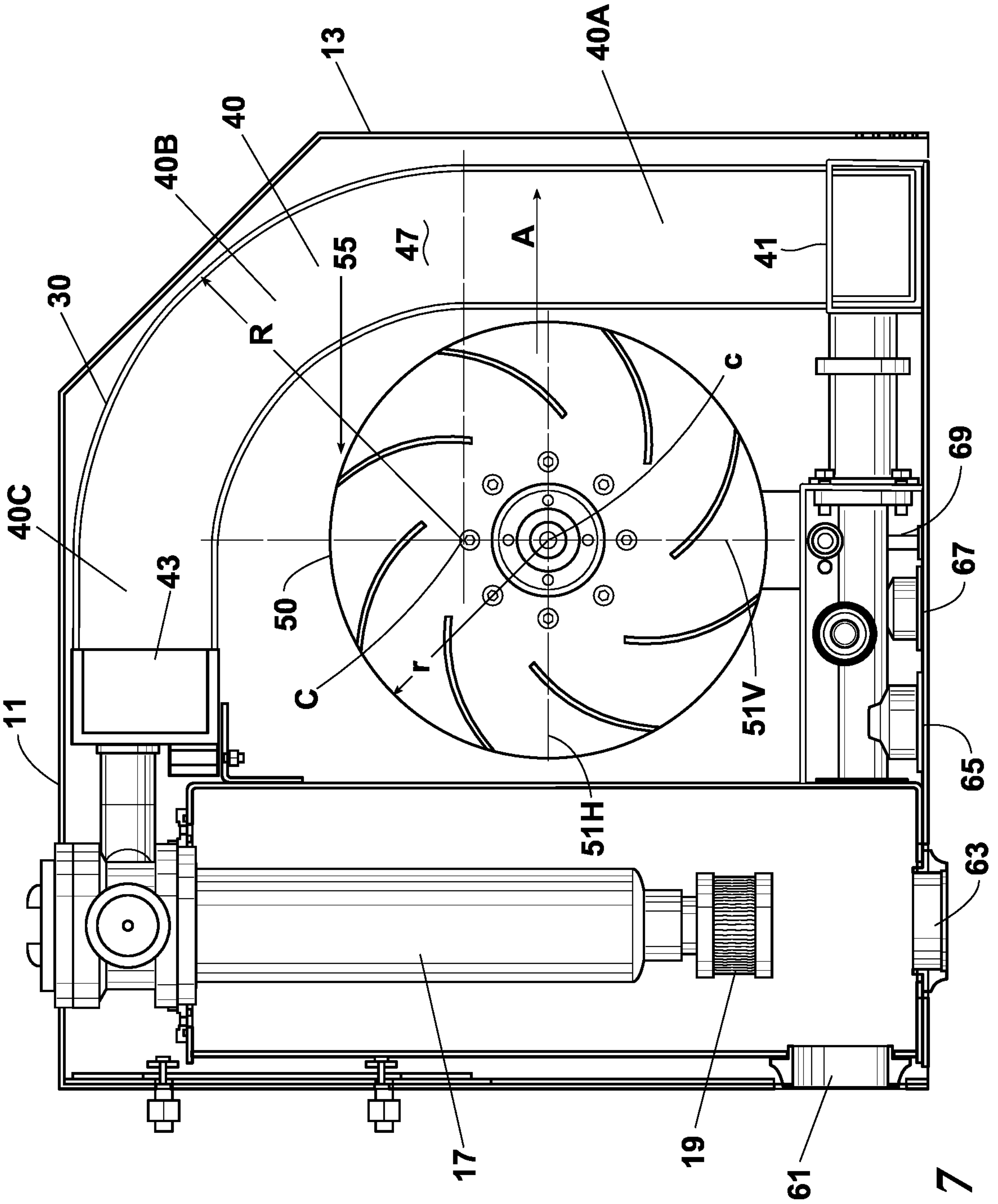
FIG. 7 is a side elevation cross-section view.
Figure 8:
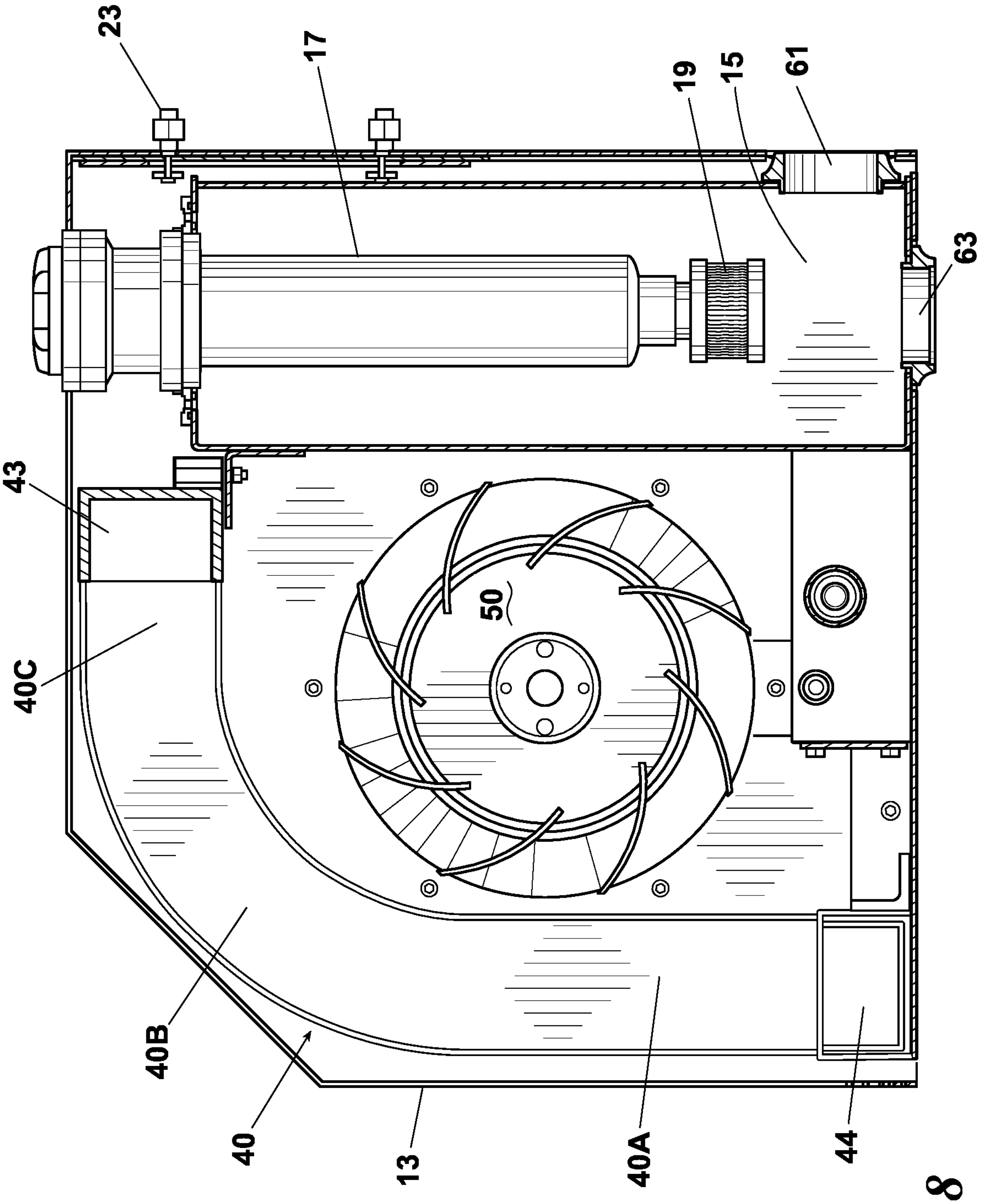
FIG. 8 is another side elevation cross-section view.
Figure 9:
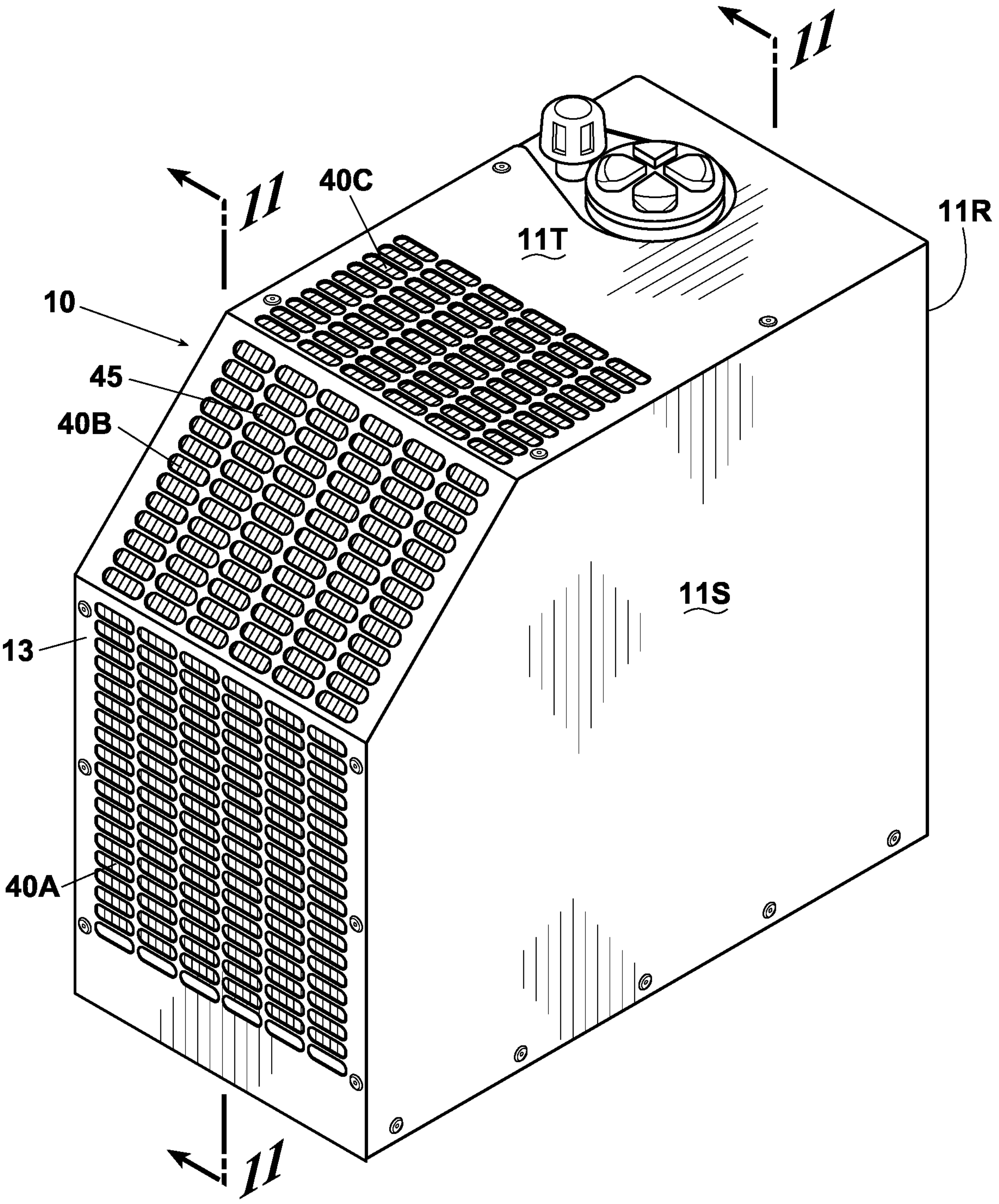
FIG. 9 is an isometric view of the cooler of FIG. 3. The cooler may be adapted for connection to a side of a pumper truck.
Figure 10:
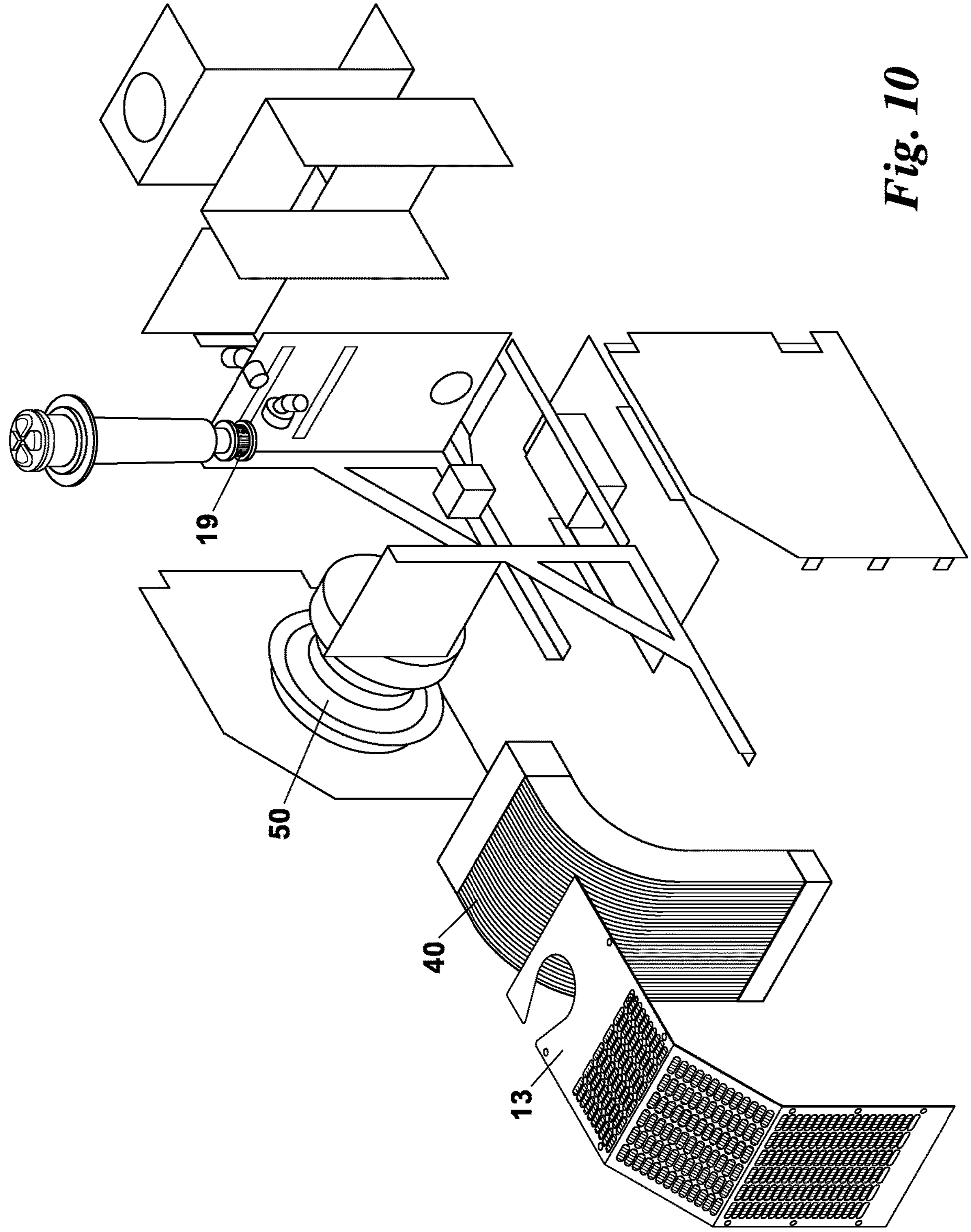
FIG. 10 is an exploded assembly view of the cooler of FIG. 3.
Figure 11:
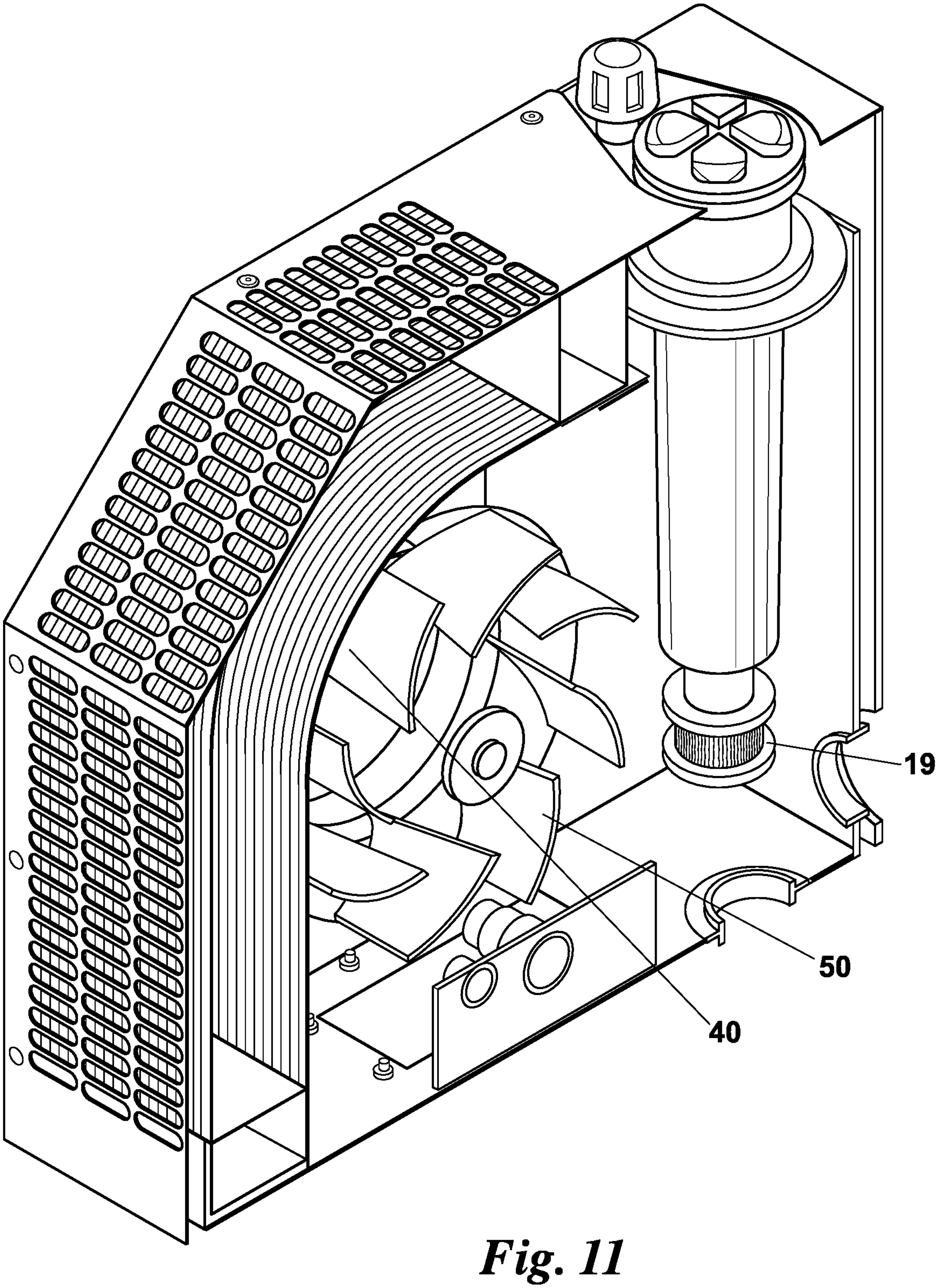
FIG. 11 is an isometric cross section view of the cooler of FIG. 3. The curved core area includes fins.
Figure 12:
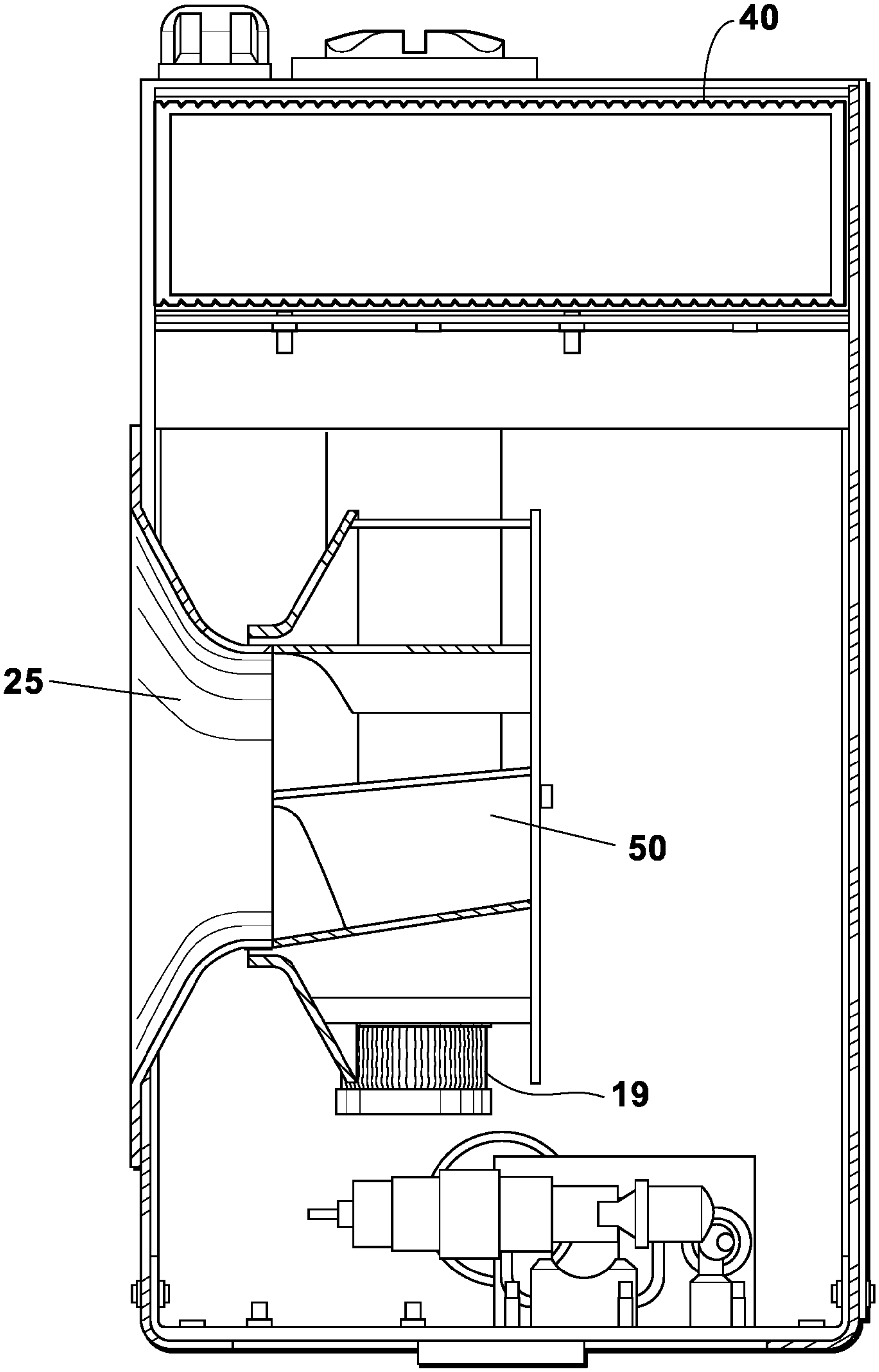
FIG. 12 is a front elevation, cross-section view of the cooler of FIG. 3.

10 Hydraulic reservoir cooler
11 Case or housing
11F Forward end of case or housing
11R Rearward end of case or housing
11S Sidewall of case or housing
11T Top of case or housing 1
13 Perforated or vented front cover of case or housing
15 Hydraulic tank
17 Hydraulic filter assembly
19 Hydraulic filter
21 Breather
23 Mounting stud
25 Air inlet
27 Sight glass
29 Access panel
30 Heat exchanger
40 Core area
40A Lower straight (vertical) section of core area
40B Curved section of core area
40C Upper straight (horizontal) section of core area
41 Lower header
43 Upper header
45 Fins
47 Manifold
50 Backward curve centrifugal fan
51 Centerline of centrifugal fan
53 Hub
55 Uppermost upper end of fan
61 Suction port
63 Suction port
65 Return port
67 Pressure port
69 Gauge port
71 Drain port
A Air flow
c Center point of centrifugal fan
C Center point of curved section of core area
r Radius of centrifugal fan
R Radius of curved section of core area

DETAILED DESCRIPTION

Embodiments of hydraulic reservoir cooler 10 of this disclosure include a heat exchanger 30 having a curved core area 40 with fins 31. The hydraulic fluid flowing into the curve 40B of the core area 40 flows 90 degrees to the path of the air A provided by a backward curve centrifugal fan 50 and the fluid flowing out of the curve 30B flows substantially parallel to the path of air A. The fluid flowing through the curve 30B flows at an oblique angle to the path of air A.

The hydraulic reservoir cooler 10 of this disclosure may be sized having a width no greater than 13 inches, a height no greater than 22 inches (55.88 cm), and a depth no greater than 22 inches. The minimal fan clearance may be in a range of 1½ to 2½ inches (3.81 to 5.08 cm). In some embodiments, the minimal fan clearance may be 2 inches (5.08 cm). The cooler 10 may be installed in a space no greater than 15 inches (38.1 cm) in width. The length, width, and height dimensions may be 22 inches by 12.6 inches by 22 inches (55.88 cm by 32 cm by 55.88 cm).

Embodiments may include only one low pressure hydraulic hose 11. Rear studs 21 may be included for side rail mounting. A bracket assembly (not shown) may be included for behind the cab mounting. The cooler 10 may include all S.A.E. ports and corresponding S.A.E. fittings. In embodiments, a SAE-32 back and bottom suction ports 61, 63, a SAE-8 case drain port 71, a SAE-24 return port 65, a SAE-20 pressure port 67, and an SAE-04 gauge port 69, or their equivalents, are provided.

The cooler 10 may have a capacity of up to 60 gpm (227 Lpm); tank 15 size may be 6 gallons (22.7 L). A dual bullseye sight glass 13 may be provided. The hydraulic fluid filter assembly 15 may include a tank top design with an integral breather and bypass 17. The bypass may be configured for 25 psi (172.4 KPa). The filter element 19 may be 10 micron filter element.

Embodiments of the system in which the hydraulic cooler 10 is used may be configured or adapted for pressures up to 4,000 psi (27.6 MPa), and can include components such as a hydraulic pup, directional control valve, a hydraulic motor, and a processing pump or compressor like in the prior art, along with suction, pressure (feed), and return lines. See e.g. FIGS. & 2. The system may include a system relief valve arrange to ensure that the maximum system pressure does not go any higher than what a user sets the valve at. By way of example, the valve may be an adjustable relief valve in a range of 500 psi to 3,000 psi (3.4 MPa to 20.7 MPa). The system may also include a cold oil bypass valve. This valve may be set, for example, at 60 psi (413.7 KPa) to ensure that the low pressure side of the hydraulic system stays at a low pressure and to protect the cooler 10 from over pressurization due to cold oil.

The fan 50 may be a hydraulic drive fan. A flow control valve can be arranged to ensure the delivery of consistent flow to the hydraulically powered cooling blower motor. The flow control valve may be factory set to ensure the most efficient blower speed.

The fan 50 has a center point "c" and radius "r" and the curve 40B of the core area 40 may have a different center point "C" and radius "R" than that of the fan 50. In embodiments, a lower straight portion 40A of the core area 40 extends in height to at least the horizontal centerline 51H of the fan 50. The lower straight portion 40A may extend past the horizontal centerline 51 in a range up to the uppermost upper end 55 of the fan 50. An upper straight portion 40C of the core area 40 may begin at or rearward of the vertical centerline 51V of the fan. An overall length of the upper straight portion 40C may be less than the overall length of the lower straight portion 40A. The curved portion 40C of the core area 40 lies between the straight portions 40A, 40C. In embodiments, the curve 40B may begin at a height between the centerline 51H and the uppermost upper end 55 of the fan 50. An upper header 43 is at the upper end of the core area 40 and a lower header 41 is at the bottom end, each header 41, 43 being on opposite sides of the vertical centerline 51V of the fan 50. In some embodiments, the lower and upper straight portions 40A, 40C are connected by a non-curved (intermediate) portion 40B. the core area 40 appearing L-shaped.

Embodiments of a hydraulic reservoir cooler 10 of this disclosure and a prior art hydraulic reservoir cooler were tested by the inventors under substantially identical conditions and their respective heat exchange performance was measured. Table 1 shows the test results of the prior art hydraulic reservoir cooler, an APSCO™ ARC-60™ hydraulic reservoir cooler. Tables 2 and 3 show the test results of a hydraulic reservoir cooler 10 of this disclosure, labeled SUPERARC-60.

TABLE 1

Heat rejection performance of prior art ARC-60, Tests 1 and 2.

| ARC-60 TEST 1<br>60 GPM, 80 DEGREE TEMP DIFF FROM AMBIENT, 3800 RPM FAN SPEED,<br>PSI AT INLET | | | | |
|---|---|---|---|---|
| TEMP MONITOR | T1 (INLET) | T2 (OUTLET) | T3 (AMBIENT) | T1-T2 (F.) |
| YELL OMEGA | 153.8 | 148.1 | 73.7 | 5.7 |
| | | | BTU/HR REJECTED: | 71820 |
| | | | HP REJECTED: | 28.21 |

| ARC 60 TEST 2<br>? GPM, 100 DEGREE TEMP DIFF FROM AMBIENT, RPM FAN SPEED,<br>PSI AT INLET 3.4 | | | | |
|---|---|---|---|---|
| TEMP MONITOR | T1 (INLET) | T2 (OUTLET) | T3 (AMBIENT) | T1-T2 (F.) |
| YELL OMEGA | 153.4 | 146.8 | 73.4 | 6.6 |
| | | | BTU/HR REJECTED: | 0 |
| | | | HP REJECTED: | 0.00 |

TABLE 1-continued

Heat rejection performance of prior art ARC-60, Tests 1 and 2.

OTHER INFO:
FAN SPEED: 3800
AIR VELOCITY: SEE CHART BELOW
FLOW CONTROL: RAN WITHOUT FLOW CONTROL
MOTOR: STOCK ARC 30
WEIGHT: ?

ARC 60 FAN SPEED TEST RESULTS
STOCK ARC 30 MOTOR
T = 140 DEGREES F.

| HERTZ | PRESSURE (PSI) | FAN SPEED (RPM) | MAX AIR FLOW (FT/MIN) |
|---|---|---|---|
| 50 | 2850 | 5191 | 3740 |
| 48 | 2650 | 4950 | |
| 46 | 2450 | 4740 | 3337 |
| 44 | 2275 | 4580 | |
| 42 | 2080 | 4420 | 3170 |
| 40 | 1930 | 4197 | |
| 38 | 1800 | 4000 | 2750 |
| 36 | 1625 | 3806 | |
| 34 | 1465 | 3627 | 2560 |
| 32 | 1350 | 3460 | |
| 30 | 1220 | 3287 | 2200 |
| 28 | 1080 | 3088 | |
| 26 | 960 | 2860 | 1950 |

TABLE 2

Heat rejection performance of an embodiment of this disclosure, Test 1.

SUPER ARC 60 REV2 HEAT REJECTION TEST 1 JUN. 28, 2021
58.6 GPM, 80 DEGREE TEMP DIFF FROM AMBIENT, 3800 RPM FAN SPEED, PSI AT MOTOR_2000

| TEMP MONITOR | T1 (INLET) | T2 (OUTLET) | T3 (AMBIENT) | T1-T2 (F.) |
|---|---|---|---|---|
| YELL OMEGA | 158 | 148.6 | 78 | 9.4 |
| YELL OMEGA | 158.2 | 148.9 | 78.2 | 9.3 |
| | | | AVG: | 9.35 |
| | | | BTU/HR REJECTED: | 115061.1 |
| | | | HP REJECTED: | 45.20 |

SUPER ARC 60 REV 2 TEST 2 (4000 RPM) JUN. 28, 2021
58.6 GPM, 80 DEGREE TEMP DIFF FROM AMBIENT, 4400 RPM FAN SPEED, PSI AT MOTOR 2300

| TEMP MONITOR | T1 (INLET) | T2 (OUTLET) | T3 (AMBIENT) | T1-T2 (F.) |
|---|---|---|---|---|
| YELL OMEGA | 158.4 | 149 | 78.4 | 9.4 |
| | | | AVG: | 9.40 |
| | | | BTU/HR REJECTED: | 115676.4 |
| | | | HP REJECTED: | 45.44 |

MAX FAN VELOCITY: 3500 CFM
FLOW CONTROL: NONE
MOTOR: ARC 60
WEIGHT: 147ISHLBS
PRESSURE DROP ACROSS HX at 58.6 GPM AND 158F FLUID = 19 PSI
PRESSURE AT RETURN PORT INLET AT 58.6 GPM AND 158F FLUID = 44.4 PSI

TABLE 3

Heat rejection performance of an embodiment of this disclosure, Test 2.

SUPER ARC 60 REV2 HEAT REJECTION TEST 2 JUN. 30, 2021
58.6 GPM, 80 DEGREE TEMP DIFF FROM AMBIENT, 3800 RPM FAN SPEED, PSI AT MOTOR_2000

| TEMP MONITOR | T1 (INLET) | T2 (OUTLET) | T3 (AMBIENT) | T1-T2 (F.) |
|---|---|---|---|---|
| TITAN S8 | 158.8 | 149.94 | 78.8 | 8.86 |
| | | | AVG: | 8.86 |
| | | | BTU/HR REJECTED: | 109031.16 |
| | | | HP REJECTED: | 42.83 |

SUPER ARC 60 REV 2 TEST 2 (50 DEGREE DELTA) JUN. 30, 2021
58.6 GPM, 50 DEGREE TEMP DIFF FROM AMBIENT, 3800 RPM FAN SPEED, PSI AT MOTOR 2000

| TEMP MONITOR | T1 (INLET) | T2 (OUTLET) | T3 (AMBIENT) | T1-T2 (F.) |
|---|---|---|---|---|
| TITAN S8 | 128.2 | 121.8 | 78.2 | 6.4 |
| | | | AVG: | 6.40 |
| | | | BTU/HR REJECTED: | 78758.4 |
| | | | HP REJECTED: | 30.94 |

MAX FAN VELOCITY: 3500 CFM
FLOW CONTROL: NONE
MOTOR: ARC 60
WEIGHT: 147ISHLBS
PRESSURE DROP ACROSS HX at 58.6 GPM AND 158F FLUID = 19 PSI
PRESSURE AT RETURN PORT INLET AT 58.6 GPM AND 158F FLUID = 44.4 PSI

A hydraulic reservoir cooler 10 of this disclosure provides increased heat rejection in the same space envelope as prior art hydraulic reservoir coolers because of the longer flow path provided by the curved core area 40. For example, a hydraulic reservoir cooler of this disclosure—which may have a heat rejection in a range of 40 HP to 48 HP at 60 gpm (227.1 Lpm) and an entering temperature difference of 80° F.—provides heat rejection in a range of 43% to 71%, 45% to 69%, 47% to 67%, 49% to 65%, 51% to 63%, 53% to 61%, or 55% to 59% greater in the same space as an APSCO™ ARC-60™ hydraulic reservoir, which has a heat rejection of 28 HP at 60 gpm (227.1 Lpm) and an entering temperature difference of 80° F. In one test, heat rejection was 42.8 HP compared to the ARC-60's 28.2, a 51% increase. In another test, heat rejection was 45.2 compared to the ARC-60's 28.2, a 60% increase. The broader ranges listed here may have narrower sub-ranges, as well as discrete values, within each of the broader ranges.

Embodiments of a hydraulic reservoir cooler 10 of this disclosure include a backward curve centrifugal fan 50 located rearward of a vented front cover 13 of the cooler 10, the centrifugal fan 50 having a center point "c" and a radius "r" and arranged to provide substantially horizontal air flow through the vented front cover 50; and a core area 40 including fins 41 and a manifold 47 in fluid communication with a hydraulic fluid tank, the core area 40 being located between the vented front cover 13 and the backward curve centrifugal fan 50; the core area 40 further including: a straight vertical portion 41A extending in height less than an uppermost upper end 55 of the backward curve centrifugal fan 50; a straight horizontal portion 40C located above the uppermost upper end 55 of the backward curve centrifugal fan 50; and a curved portion 40C connecting the straight vertical and horizontal portions 40A, 40C, the curved portion 40B having a center point "C" and a radius "R"; where C is located above c and R is greater than r. The cooler 10 may be adapted for use with an agricultural pumper truck.

The invention claimed is:

1. A hydraulic reservoir cooler adapted for use with a hydraulic fluid tank, the hydraulic reservoir cooler comprising:

a vented front cover;

a backward curve centrifugal fan located rearward of the vented front cover, the backward curve centrifugal fan having a center point "c" and a radius "r" and arranged to provide substantially horizontal air flow through the vented front cover; and a core area including fins and a manifold adapted for fluid communication with the hydraulic fluid tank, the core area being located between the vented front cover and the backward curve centrifugal fan; the core area further including:

a straight vertical portion extending in height less than an uppermost upper end of the backward curve centrifugal fan;

a straight horizontal portion located above the uppermost end of the backward curve centrifugal fan; and an intermediate portion connecting the straight vertical and horizontal portions.

2. The hydraulic reservoir cooler of claim 1, the intermediate portion comprising a curve having a center point "C" and a radius "R";

wherein C is located above c; and wherein R is greater than r.

3. The hydraulic reservoir cooler of claim 1, wherein the core area is L-shaped.

4. A hydraulic reservoir cooler adapted for use with a hydraulic fluid tank, the hydraulic reservoir cooler comprising:

a case including a vented cover;

a backward curve centrifugal fan located rearward of the vented cover, the centrifugal fan having a center point "c" and a radius "r"; and a manifold including fins located between the vented front cover and the backward curve centrifugal fan; the manifold further including:

a straight vertical portion extending in height less than an uppermost upper end of the backward curve centrifugal fan;

a straight horizontal portion located above the uppermost end of the backward curve centrifugal fan.

5. The hydraulic reservoir cooler of claim 4, further comprising an intermediate portion connecting the straight vertical and horizontal portions.

6. The hydraulic reservoir cooler of claim 5, wherein the intermediate portion comprises a curve having a center point “C” and a radius “R”;

wherein C is located above c; and wherein R is greater than r.

* * * * *